(12) United States Patent
Hardacker et al.

(10) Patent No.: US 9,338,412 B2
(45) Date of Patent: *May 10, 2016

(54) SYSTEMS AND METHODS FOR SECURING A DIGITAL COMMUNICATIONS LINK

(71) Applicants: Sony Corporation, Tokyo (JP); Sony Electronics Inc., Park Ridge, NJ (US)

(72) Inventors: Robert Hardacker, Fallbrook, CA (US); Kenichi Kawasaki, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,647

(22) Filed: Jul. 1, 2014

(65) Prior Publication Data
US 2014/0314156 A1 Oct. 23, 2014

Related U.S. Application Data

(63) Continuation of application No. 12/021,668, filed on Jan. 29, 2008, now Pat. No. 8,792,640.

(51) Int. Cl.
| | |
|---|---|
| *H04L 29/06* | (2006.01) |
| *H04N 19/85* | (2014.01) |
| *H04N 7/167* | (2011.01) |
| *H04N 21/2383* | (2011.01) |
| *H04N 21/438* | (2011.01) |

(Continued)

(52) U.S. Cl.
CPC ............ *H04N 7/26882* (2013.01); *H04L 25/08* (2013.01); *H04L 27/0008* (2013.01); *H04N 7/1675* (2013.01); *H04N 19/85* (2014.11); *H04N 21/2383* (2013.01); *H04N 21/4382* (2013.01)

(58) Field of Classification Search
CPC .... H04L 27/0008; H04L 25/08; H04N 19/85; H04N 7/1675; H04N 21/2383; H04N 21/4382; G06F 21/606
USPC ........... 380/219, 205; 329/304, 318; 332/100, 332/103; 455/114.3; 375/298, 308
See application file for complete search history.

(56) References Cited

U.S. PATENT DOCUMENTS

| | | | |
|---|---|---|---|
| 3,610,828 A | 10/1971 | Girard | |
| 3,723,878 A | 3/1973 | Miller | |
| 4,034,402 A | 7/1977 | Brian | |

(Continued)

FOREIGN PATENT DOCUMENTS

EP 0167442 A2 1/1986

OTHER PUBLICATIONS

USPTO; Applicant-Initiated Interview Summary issued in U.S. Appl. No. 12/021,668, mailed Aug. 12, 2013, 3 pages.

(Continued)

*Primary Examiner* — Sarah Su
(74) *Attorney, Agent, or Firm* — Fitch, Even, Tabin & Flannery LLP (57) ABSTRACT

A digital data signal, such as a digital video signal, is intentionally pre-distorted before being sent over a network. In one embodiment, this pre-distortion may be performed in accordance with a pre-distortion pattern or algorithm which is shared with only intended receivers. The pre-distortion pattern may be used to vary the pre-distortion on a periodic basis, as frequently as on a symbol-by-symbol basis. The pre-distortion function may include distorting the phase and/or the amplitude of the digital signal's modulation.

11 Claims, 7 Drawing Sheets

(51) Int. Cl.
*H04L 25/08* (2006.01)
*H04L 27/00* (2006.01)

(56) References Cited

U.S. PATENT DOCUMENTS

| | | | |
|---|---|---|---|
| 4,903,297 | A | 2/1990 | Rist |
| 5,473,460 | A | 12/1995 | Haner |
| 5,481,567 | A | 1/1996 | Betts |
| 5,485,211 | A | 1/1996 | Kuzma |
| 5,504,783 | A | 4/1996 | Tomisato |
| 5,530,756 | A | 6/1996 | Bourel |
| 5,671,278 | A * | 9/1997 | Pires ............... H04N 7/1716 348/E7.056 |
| 5,812,594 | A | 9/1998 | Rakib |
| 5,822,429 | A | 10/1998 | Casabona |
| 6,204,725 | B1 | 3/2001 | Ohishi |
| 6,606,296 | B1 | 8/2003 | Kokkonen |
| 6,812,864 | B2 | 11/2004 | Koto |
| 6,907,124 | B1 * | 6/2005 | Gluckstad ............... 380/205 |
| 6,947,493 | B2 | 9/2005 | Cohen |
| 6,973,188 | B1 | 12/2005 | Seitner |
| 7,010,180 | B2 | 3/2006 | van Wijngaarden |
| 8,457,175 | B2 * | 6/2013 | Hardacker et al. .......... 375/133 |
| 8,792,640 | B2 * | 7/2014 | Kawasaki et al. .......... 380/219 |
| 2001/0053009 | A1 * | 12/2001 | Nojima ............ H04B 10/0775 398/141 |
| 2002/0196844 | A1 | 12/2002 | Rafie |
| 2003/0058959 | A1 | 3/2003 | Rafie |
| 2003/0072296 | A1 | 4/2003 | Odenwalder |
| 2004/0181666 | A1 | 9/2004 | Candelore |
| 2004/0246101 | A1 | 12/2004 | Cole |
| 2005/0063479 | A1 * | 3/2005 | Propp ............... H04L 1/0003 375/260 |
| 2005/0185731 | A1 | 8/2005 | Hardin |
| 2006/0013285 | A1 | 1/2006 | Kobayashi |
| 2006/0066469 | A1 | 3/2006 | Foote |
| 2007/0058693 | A1 | 3/2007 | Aytur |
| 2007/0237274 | A1 | 10/2007 | Nakache |
| 2007/0255679 | A1 | 11/2007 | Hosoi |
| 2008/0043861 | A1 | 2/2008 | Moffatt |
| 2008/0089222 | A1 | 4/2008 | Kim |
| 2008/0107430 | A1 | 5/2008 | Jackel |
| 2008/0130785 | A1 | 6/2008 | Reinhardt |
| 2008/0214126 | A1 | 9/2008 | Holt |
| 2009/0034408 | A1 | 2/2009 | Kim |
| 2009/0190651 | A1 | 7/2009 | Yoneya |
| 2010/0002750 | A1 | 1/2010 | Hardacker |
| 2010/0159855 | A1 | 6/2010 | Hardacker |
| 2012/0083235 | A1 | 4/2012 | Gomez |
| 2012/0307936 | A1 | 12/2012 | Murakami |

OTHER PUBLICATIONS

USPTO; Applicant-Initiated Interview Summary issued in U.S. Appl. No. 12/021,668, mailed Dec. 20, 2013, 3 pages.

USPTO; Final Office Action issued in U.S. Appl. No. 12/021,668, mailed Nov. 7, 2012, 19 pages.

USPTO; Final Office Action issued in U.S. Appl. No. 12/021,668, mailed Oct. 25, 2013, 20 pages.

USPTO; Final Office Action issued in U.S. Appl. No. 12/021,668, mailed Oct. 4, 2011, 17 pages.

USPTO; Notice of Allowance issued in U.S. Appl. No. 12/021,668, mailed Feb. 10, 2014, 9 pages.

USPTO; Notice of Allowance issued in U.S. Appl. No. 12/021,668, mailed Mar. 19, 2014, 9 pages.

USPTO; Notice of Allowance issued in U.S. Appl. No. 12/556,819, mailed Jan. 28, 2013, 5 pages.

USPTO; Office Action issued in U.S. Appl. No. 12/021,668, mailed Jun. 13, 2013, 19 pages.

USPTO; Office Action issued in U.S. Appl. No. 12/021,668, mailed May 10, 2012, 17 pages.

USPTO; Office Action issued in U.S. Appl. No. 12/021,668 mailed Apr. 15, 2011, 16 pages.

USPTO; Office Action issued in U.S. Appl. No. 12/556,819, mailed Oct. 9, 2012, 16 pages.

* cited by examiner

SYSTEMS AND METHODS FOR SECURING A DIGITAL COMMUNICATIONS LINK

This application is a continuation of U.S. application Ser. No. 12/021,668, filed Jan. 29, 2008 which is incorporated in its entirety herein by reference.

FIELD OF THE INVENTION

The invention relates in general to securing communications, and in particular, to securing communications link based on intentional signal pre-distortion, pre-emphasis or even varying modulation schemes.

BACKGROUND OF THE INVENTION

Communications, whether wireline or wireless, often involve the transfer of sensitive information. In order to avoid exposing or otherwise allowing third-party access to such information, sensitive communications are typically encrypted using various known cryptographic algorithms, such as the Advanced Encryption Standard (AES), Data Encryption Standard (DES), etc. However, use of such cryptographic algorithms involve both encrypting and decrypting communications, which tends to contribute a relatively large amount of processing overhead to the overall communication process. This can be particularly burdensome in the context of high-definition video content which alone requires a relatively high amount of processing power to perform both the encoding and decoding functions.

In addition, particularly in the wireless context, the quality of the communication channel can quickly degrade. Such signal distortion must be compensated for on the receiver-side before the signal can be properly demodulated. Thus, in order to properly receive an encrypted video signal, both a signal distortion correction operation and a decryption operation must be performed before the signal itself can even be demodulated in accordance with whatever video modulation scheme is being used (e.g., Binary Phase-shift Keying (BPSK), Quadrature phase-shift keying (QPSK), Quadrature amplitude modulation (QAM), Orthogonal Frequency-Division Multiplexing (OFDM), etc.). The end result is that relatively complex and expensive hardware is required on the receiver-side in order to accurately process the incoming encrypted video stream. Thus, there is a need for a system and method for securing a communication link that do not rely on traditional encryption schemes.

SUMMARY OF THE INVENTION

Disclosed and claimed herein are methods, systems and devices for providing secure digital communications. In one embodiment, a method includes receiving a pre-distortion pattern, receiving a pre-distorted data signal over a network connection, and undistorting at least one of a phase and an amplitude of the pre-distorted data signal in accordance with said pre-distortion pattern.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Disclosure Overview

One aspect of the present disclosure relates to pre-distorting the modulation of a digital data signal, such as a digital video signal, sent over a network so as to secure or otherwise inhibit third-party access to the content of the communication. In one embodiment, the pre-distortion may be performed (e.g., by a transmitter) in accordance with a pre-distortion pattern or algorithm which is shared with only intended receivers. It should further be appreciated that the pre-distortion pattern may be used to vary the pre-distortion on a periodic basis, as frequently as on a symbol-by-symbol basis. The pre-distortion function may include distorting the phase and/or the amplitude of the signal's modulation. Without knowledge of the type and amount of pre-distortion applied, an unintended receiver will have difficulty interpreting or otherwise demodulating the subject communication. Other embodiments and aspects are disclosed and claimed herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

It should be appreciated that the invention and processes described herein may be implemented using hardware, software or any combination thereof (e.g., embedded logic), and the invention should not be limited to any particular system design or implementation.

Exemplary Embodiments

Figure 1A:
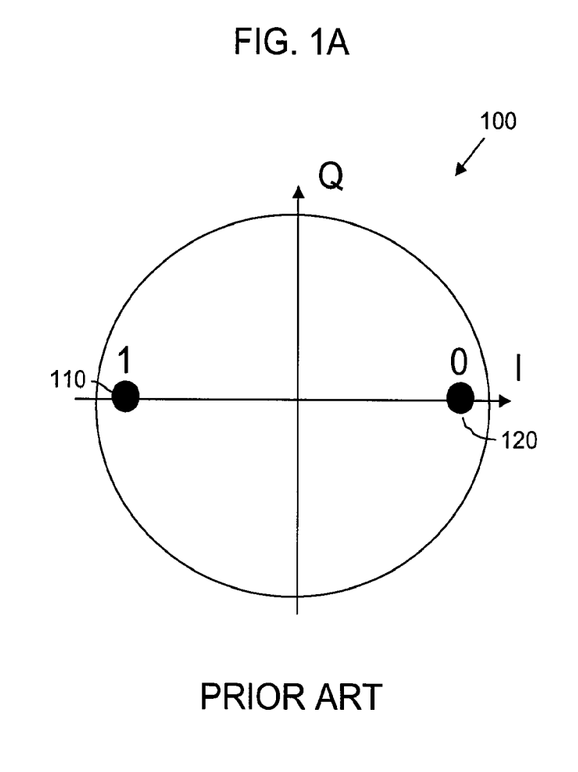
FIG. 1A depicts a typical BPSK constellation diagram without distortion.

FIG. 1A depicts a typical constellation diagram 100 for a BPSK modulated signal. BPSK, like all digital modulation schemes, utilizes a finite number of distinct symbols to represent digital data. In particular, BPSK uses a finite number of carrier wave phases, each assigned a unique pattern of binary bits. In addition, each pattern of bits forms the symbol that is represented by a particular phase. A receiver-side decoder or demodulator will determine the phase of the received signal and map it back to the symbol it represents, thus recovering the original data. This requires the receiver to be able to compare the phase of the received signal to a reference signal. In addition to phase-shift keying, other shift keying types include amplitude-shift keying (ASK), frequency-shift keying (FSK) and (PSK).

BPSK modulation utilizes two phases—represented in FIG. 1A by constellation points 110 and 120, respectively. The BPSK constellation points 110 and 120 are positioned with uniform angular spacing to impart maximum phase-separation between adjacent points. In addition, they are positioned on a circle so as to be transmitted using the same energy. In this fashion, the amplitudes needed to represent the data within the carrier wave will be the same regardless of the data composition.

FIG. 1A includes the real and imaginary axes—referred to as the in-phase and quadrature axes respectively. In short, the amplitude of each point along the in-phase axis is used to modulate a cosine (or sine) carrier wave and the amplitude along the quadrature axis to modulate a sine (or cosine) wave. In short, a BPSK symbol comprised of constellation point 110 will denote a binary bit value of "1," while a BPSK symbol comprised of constellation point 120 will denote a binary bit value of "0".

In reality, data may be inadvertently distorted due to degrading channel conditions, interference and the like. Thus, while FIG. 1A show a "1" bit as being 180 degrees on the I-axis and a "0" as being 0 degrees on the I-axis, channel distortion can shift constellation point positions and, as such, receivers are expected to be able to differentiate between a "1" and a "0" with less than 90 degrees distortion.

Figure 1B:
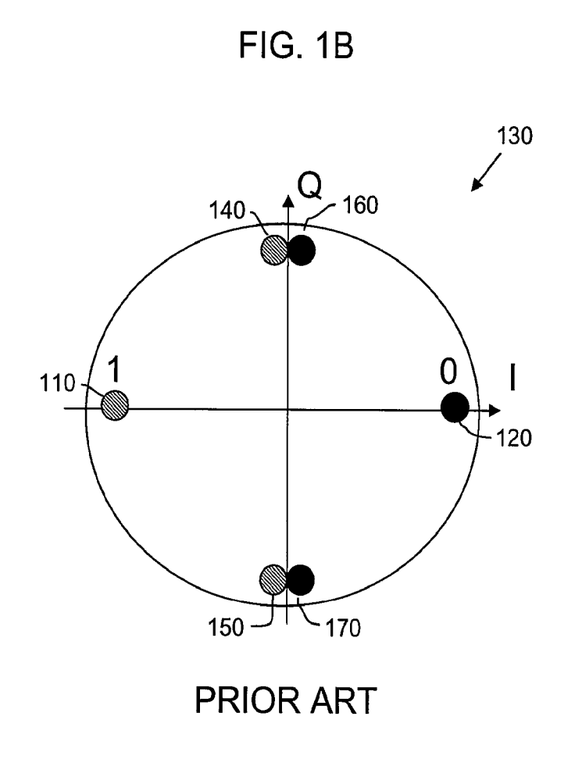
FIG. 1B depicts a typical BPSK constellation diagram with distortion.

By way of illustration, FIG. 1B depicts a constellation diagram 130 in which both constellation points 110 and 120 may be distorted by ±89 degrees. For example, constellation point 140 represents a +89 degrees phase distortion relative to the "1" bit, while constellation point 150 represents a −89 degrees phase distortion relative to the "1" bit. Similarly, constellation point 160 represents a −89 degrees phase distortion relative to the "0" bit, while constellation point 170 represents a +89 degrees phase distortion relative to the "0" bit. However, if the phase distortion exceeded 90 degrees, it would be difficult for the receiver to distinguish between a "1" bit and a "0" bit.

In order to compensate for signal distortion (particularly phase distortion greater than ±89 degrees), a preamble or header frame may be used. That is, a data stream will be preceded by a preamble comprised of a string of predetermined bits. This string of predetermined bits is known to the receiver and, as such, can be compared to a known reference pattern in order to determine the amount and direction of phase distortion correction to apply to the incoming signal. The preamble may be sent only once, or periodically in order to account for changing channel conditions.

Figure 2A:
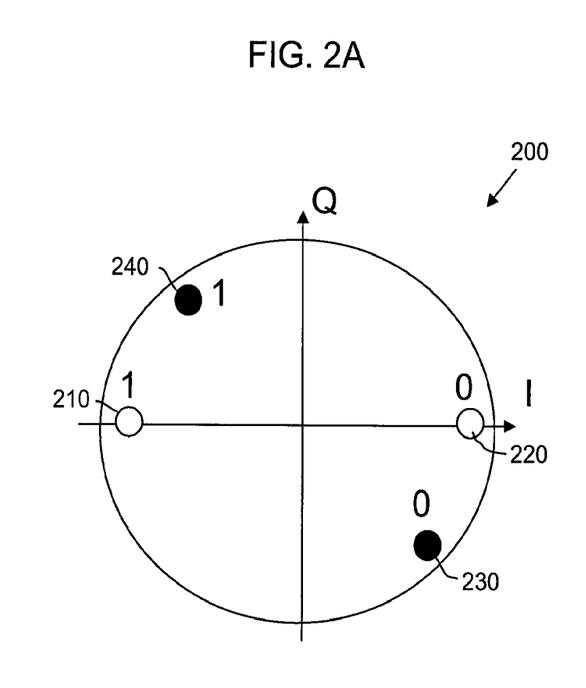
FIGS. 2A-2B depict a BPSK constellation diagram for one embodiment of the invention.

With the above provided by way of background, one embodiment of the invention relates to pre-distorting the modulation of a digital data signal such that only an intended receiver is able to discriminate the distortion correctly. To that end, FIG. 2A depicts a BPSK diagram for a preamble 200 in accordance with one embodiment of the invention. In particular, a typical receiver using BPSK modulation would expect the "1" bit to be in or around position 210 and the "0" bit to be in and around position 220. Upon receiving the preamble 200, a typical receiver would compare the preamble 200 to a reference preamble and determine that the actual signal distortion has rotated the constellation points 230 and 240 by 45 degrees, as shown in FIG. 2A. A complimentary phase correction would then be applied to all subsequently-received data.

Figure 2B:
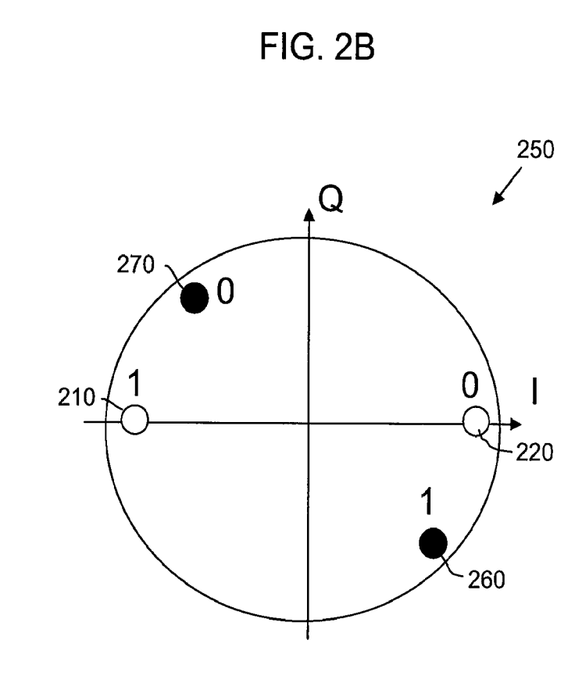

However, if a pre-distortion of 90 degrees is applied to the data packets which follow the aforementioned preamble, the correction applied by all unsuspecting receivers would erroneously interpret each "1" bit as a "0" bit and each "0" bit as a "1" bit. For example, the diagram of data frame 250 in FIG. 2B shows the actual positions of constellation points 260 and 270, which, based on the preamble 200 of FIG. 2A, would be incorrectly rotated to positions 220 and 210, respectively. For any receiver which was not aware of the 90 degree pre-distortion, the frame 250 would be interpreted incorrectly. In this fashion, the communication link between a transmitter and an intended receiver would be secured.

While in certain embodiments, the preamble itself (e.g., preamble 200) may also be pre-distorted in accordance with a pre-distortion pattern. It should further be appreciated that an undistorted preamble may be sent instead and used by all available receivers to correct for actual channel distortion in the normal course. However, the signal, which would follow such a preamble, may then be pre-distorted by the transmitter such that the data is unreadable by any unintended receiver, despite the fact such unintended receivers have properly corrected for actual signal distortion in accordance with the undistorted preamble received.

While in one embodiment the pre-distortion may be applied only once, such as at the beginning of the transmission, it should further be appreciated that the amount or direction of the pre-distortion may vary periodically, even as frequently as on a symbol-by-symbol basis. When the pre-distortion varies, the variable distortion applied by the transmitter may be generated in accordance with a pattern or algorithm which is shared with only intended receivers prior to transmission.

While the disclosure to this point has used BPSK modulation as the basis for an exemplary embodiment, it should further be appreciated that the principles of the invention are equally applicable to any other modulation scheme, such as QPSK, QAM, OFDM, etc. Additionally, the pre-distortion may include amplitude pre-distortion, either separately or in combination with the aforementioned phase pre-distortion. In still another embodiment, the communication link may be secured using pre-emphasis or by varying the modulation scheme on a periodic basis, including on a packet-by-packet or symbol-by-symbol basis.

For those embodiments which vary the pre-distortion rapidly (e.g., symbol-by-symbol), typical receivers will not be able to adjust quickly enough to such radically varying channel conditions in order to properly demodulate the received signal. In short, without advance knowledge of the distortion pattern unintended receivers will not be able to keep up with the rapidly changing distortion. Thus, by providing an intended receiver with the pre-distortion pattern (e.g., direction and amount of rotation), the communication link may be effectively secured.

Figure 3A:
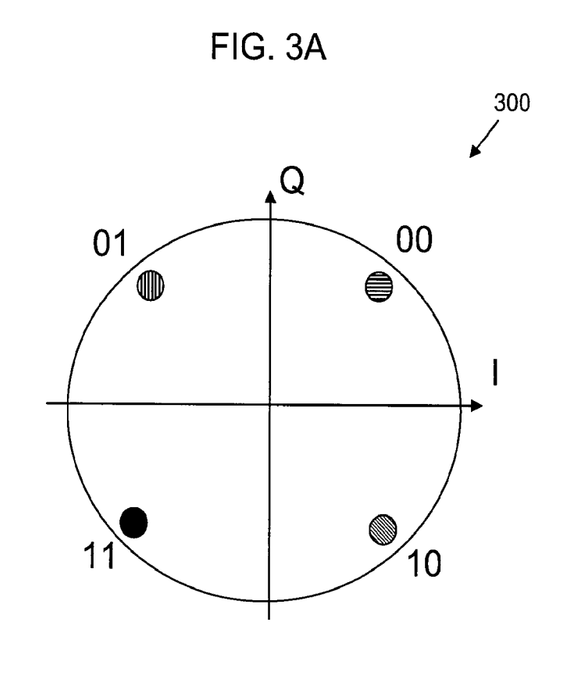
FIG. 3A depicts a typical QPSK constellation diagram of the prior art.
Figure 3B:
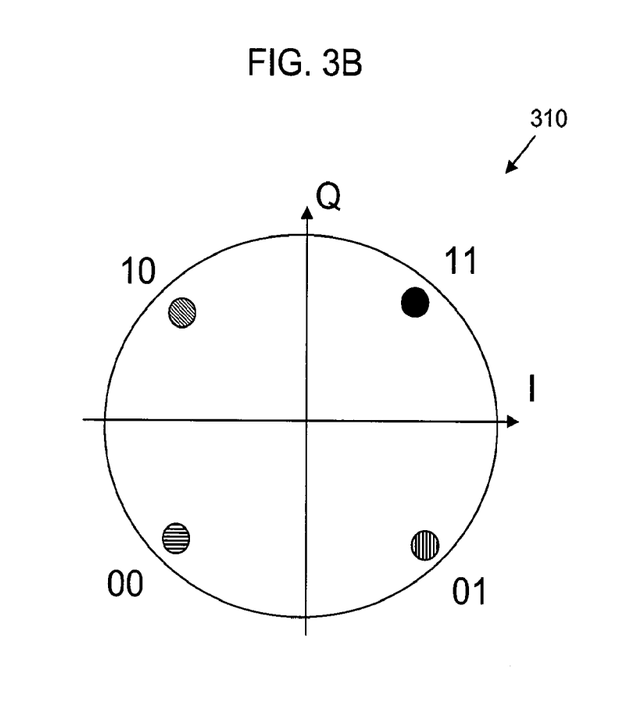
FIG. 3B depicts a QPSK constellation diagram for one embodiment of the invention.

Referring now to FIGS. 3A-3B, depicted QPSK constellation diagrams 300 and 310 representative of another embodiment of the invention. In particular, FIG. 3A depicts a QPSK diagram 300 reflecting the expected position for each of the possible constellation points (i.e., 00, 10, 11, and 01). However, FIG. 3B depicts a QPSK diagram 310 in which the signal has been pre-distorted by rotating the possible constellation points by 180 degrees. In this fashion, any unsuspecting receivers would incorrectly interpret the received symbols, and hence be unable to read the data stream.

Figure 4A:
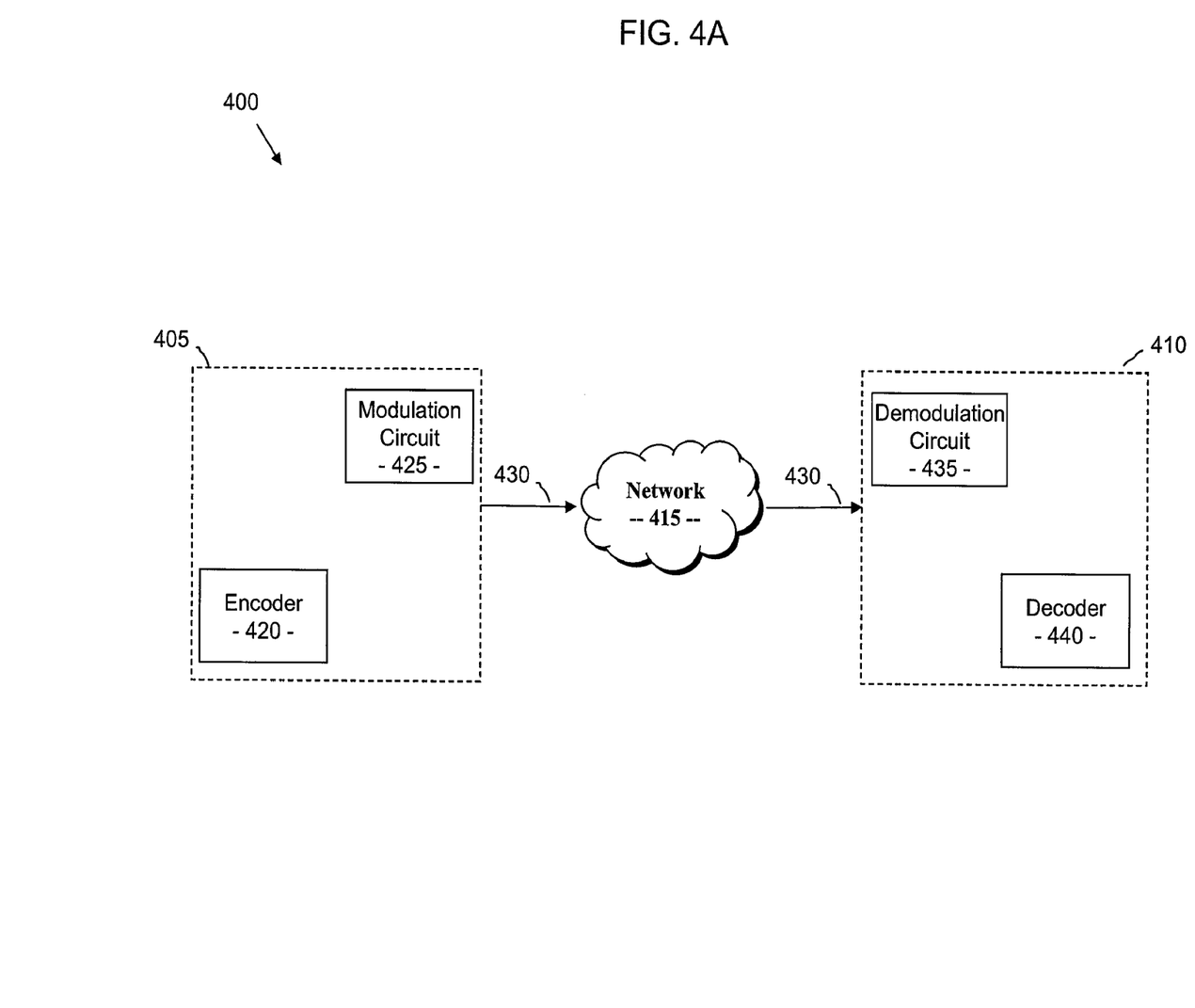
FIGS. 4A-4B depict simplified system-level diagrams for one or more embodiments of the invention.

With reference now to FIG. 4A, depicted is one embodiment of a system 400 for carrying out one or more aspects of the invention. In particular, system 400 includes a transmitter 405 in communication with a receiver 410 over a network 415, which may comprise a wireline or wireless network utilizing any known communication protocol, such as a 802.11x or the like.

As shown, transmitter 405 includes at least an encoder 420 and a modulation circuit 425. In one embodiment, the encoder 420 encodes data, such as video data from a source (not shown) in order to provide digital signal 430 to some destination point (i.e., receiver 410) via a network 415. In one embodiment, the encoder 420 may encode video content in accordance with the H.264/AVC coding standard, or any other video encoding standard. Once encoded, the digital signal 430 is provided to the modulation circuit 425 for modulation and eventual transmission out over network 415. It should of course be appreciated that any video encoding scheme may be used, and that the network 415 may comprise any wireline or wireless network, such as 802.11x wireless network.

In one embodiment, the modulation circuit 425 may also perform the pre-distortion operation as described above, and as will be described in more detail below as well with reference to FIG. 5, wherein the phase and/or amplitude of the outgoing signal is intentionally altered. In one embodiment, the pre-distortion corresponds to a predetermined pattern or algorithm.

Continuing to refer to FIG. 4A, digital signal 430 is transmitted via network 415 to receiver 410. As shown, receiver includes at least a demodulation circuit 435 and decoder 440. Once the digital signal 430 is received by the receiver 410, the demodulation circuit 435 may demodulate the received signal by undistorting the modulation of the digital signal 430 as described above, and as will be described in more detail below as well with reference to FIG. 6.

Once the signal is undistorted, the digital signal 430 may be decoded by decoder 440 using the appropriate coding standard used by the encoder 420 (e.g., H.264/AVC).

Although not depicted, it should equally be appreciated that the transmitter 405 and/or receiver 410 may include other components, such as a central processing unit (CPU) or other known controller circuitry. Moreover, as the invention may be implemented using any combination of software and hardware, the transmitter 405 and receiver 410 may include embedded logic for carrying out the processes of the invention, as detailed herein.

Other components of the transmitter 405 and/or receiver 410 may include random access memory, non-volatile memory (e.g., hard disk, floppy disk, CD-ROM, DVD-ROM, tape, high density floppy, high capacity removable media, low capacity removable media, solid state memory device, etc., and combinations thereof). Additionally, the transmitter 405 and/or receiver 410 may include a network interface (e.g., a network interface card, a modem interface, integrated services digital network, etc.) for communication over network 415.

It should be appreciated that system 400 may have numerous alternate configurations other than as depicted in FIG. 4A. For example, the encoder 420 may be separate from the transmitter 405 and/or the decoder 440 need not be integrated into the receiver 410.

Figure 4B:
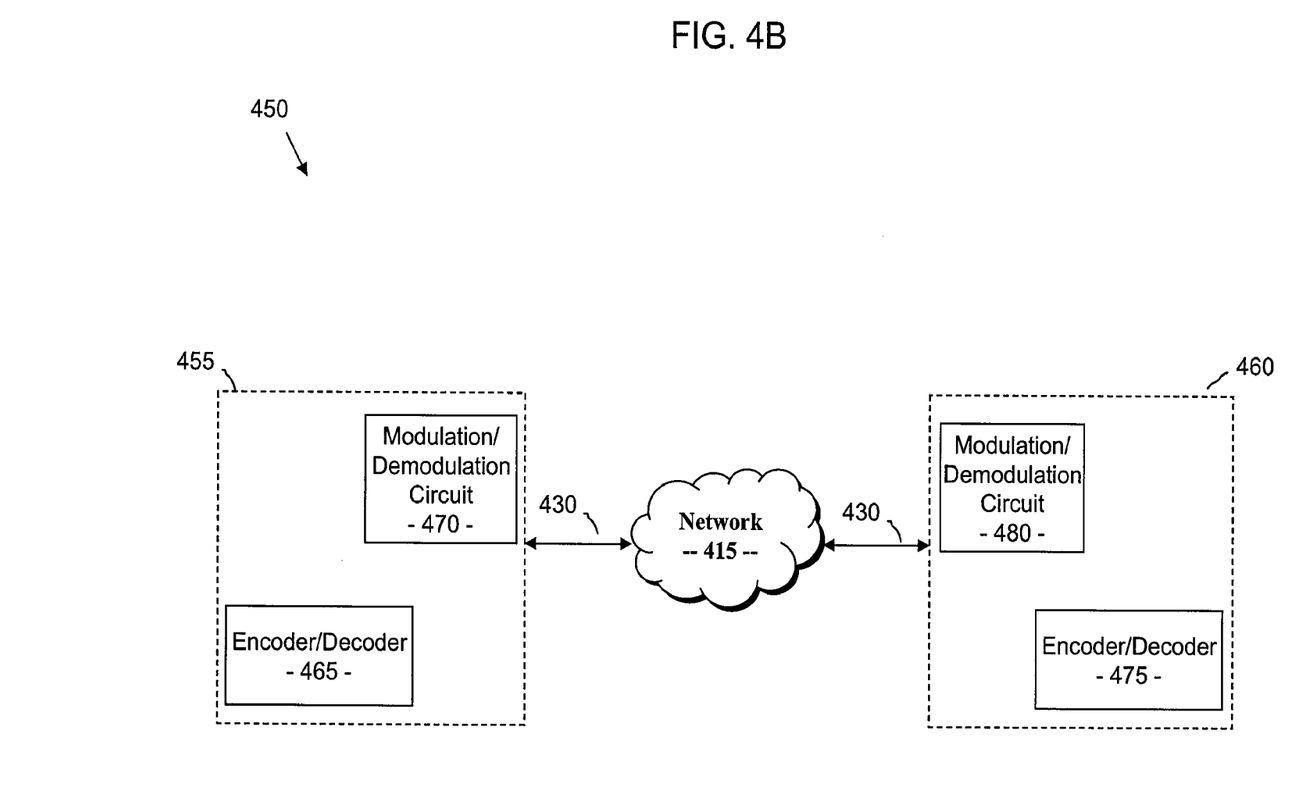

FIG. 4B depicts another embodiment of a system 450 configured to implement one or more embodiments of the invention. In particular, system 450 includes a first transceiver 455 in communication with a second transceiver 460 over the network 415. Since it is likely that communication will be two-way, the first and second transceivers may exchange the encoded data 430 over 415 in a back-and-forth manner. In order to provide two-way functionality, the first and second transceivers 455 and 460 may each include an encoder/decoder 465 and 475, respectively, which are each configured to perform both encoding and decoding operations.

The first and second transceivers 455 and 460 are further depicted as each including a modulation/demodulation circuit 470 and 480, respectively, for both modulating and demodulating the encoded data 430 for transmission over the network 415. In this fashion, the first transceiver 455 may be configured to perform the pre-distortion operation described above when transmitting data, as well as to perform the reverse distortion operation when receiving data. Similarly, the second transceiver 460 may similarly be configured to perform both pre-distortion and corresponding reverse distortion operations when transmitting and receiving data respectively.

Figure 5:
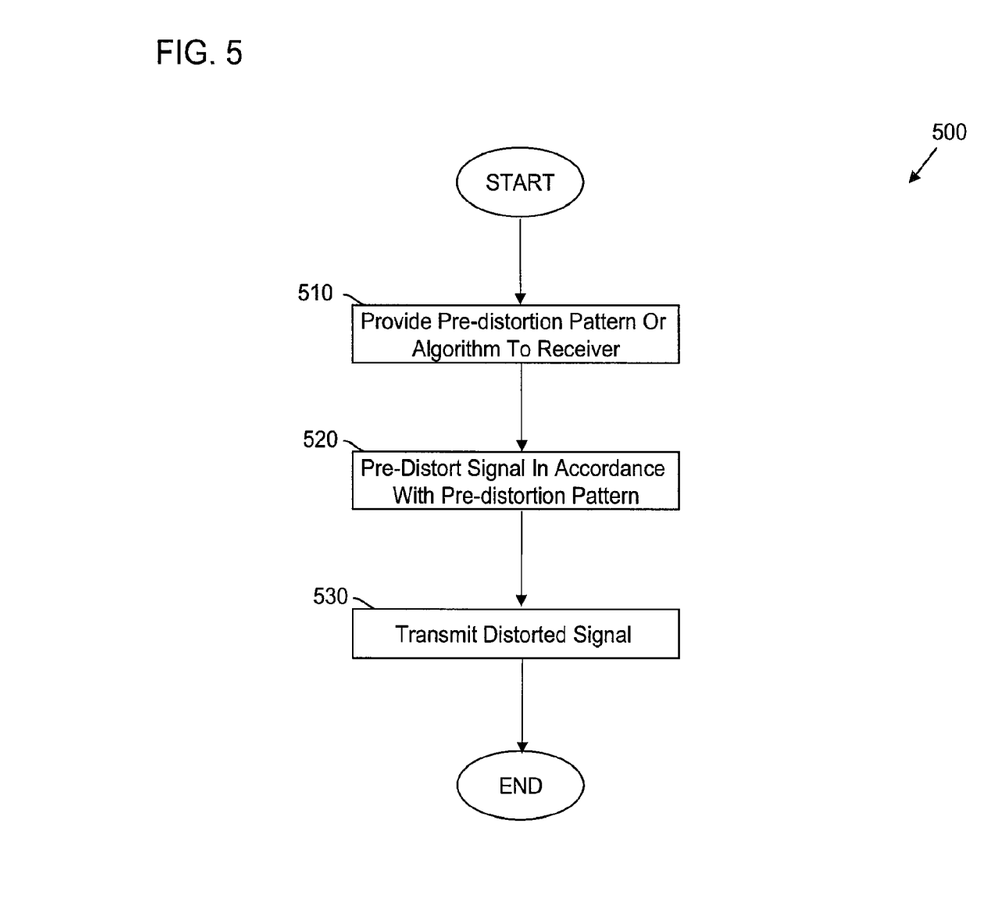
FIG. 5 is one embodiment of a process for implementing one or more aspect of the invention.

Referring now to FIG. 5, depicted is one embodiment of a process to be carried out by the transmission side of a communication system (e.g., system 400 or 450) configured in accordance with the principles of the invention. In particular, process 500 begins at block 510 with a receiver being provided with a pre-distortion pattern or algorithm. It should be appreciated that the pattern may be provided to the receiver in any manner, so long as it precedes the reception of the pre-distorted signal at issue. In one embodiment, the pre-distortion pattern may include data representative of how a given modulation scheme is to be varied prior to transmission such as, but not limited to, a distortion of the phase and/or amplitude of the signal modulation. Similarly, the pre-distortion pattern may include data representative of how a modulation scheme may be changed from one scheme to another (e.g., change from BPSK to QPSK, from QPSK to QAM, from QAM to OFDM, etc.).

Process 500 may then continue to block 520 where the signal in question is pre-distorted by a transmitter (e.g., during signal modulation), in accordance with the pre-distortion pattern that was provided to the receiver above in block 510. While in one embodiment, the pre-distortion includes distorting the phase and/or the amplitude of the modulated signal, it should equally be appreciated that the signal may be distorted in numerous other fashions, such as changing the modulation scheme.

While the operation of block 520 is depicted as being a single distortion operation, it should be appreciated that such pre-distortion may vary periodically during signal transmission, even as frequently as on a symbol-by-symbol basis. When the pre-distortion varies, the variable distortion applied by the transmitter may similarly be generated in accordance with the pre-distortion pattern of block 510.

Once distorted in accordance with the previously-described pre-distortion pattern, process 500 continues to block 530 where the pre-distorted signal may then be transmitted out over a network connection.

Figure 6:
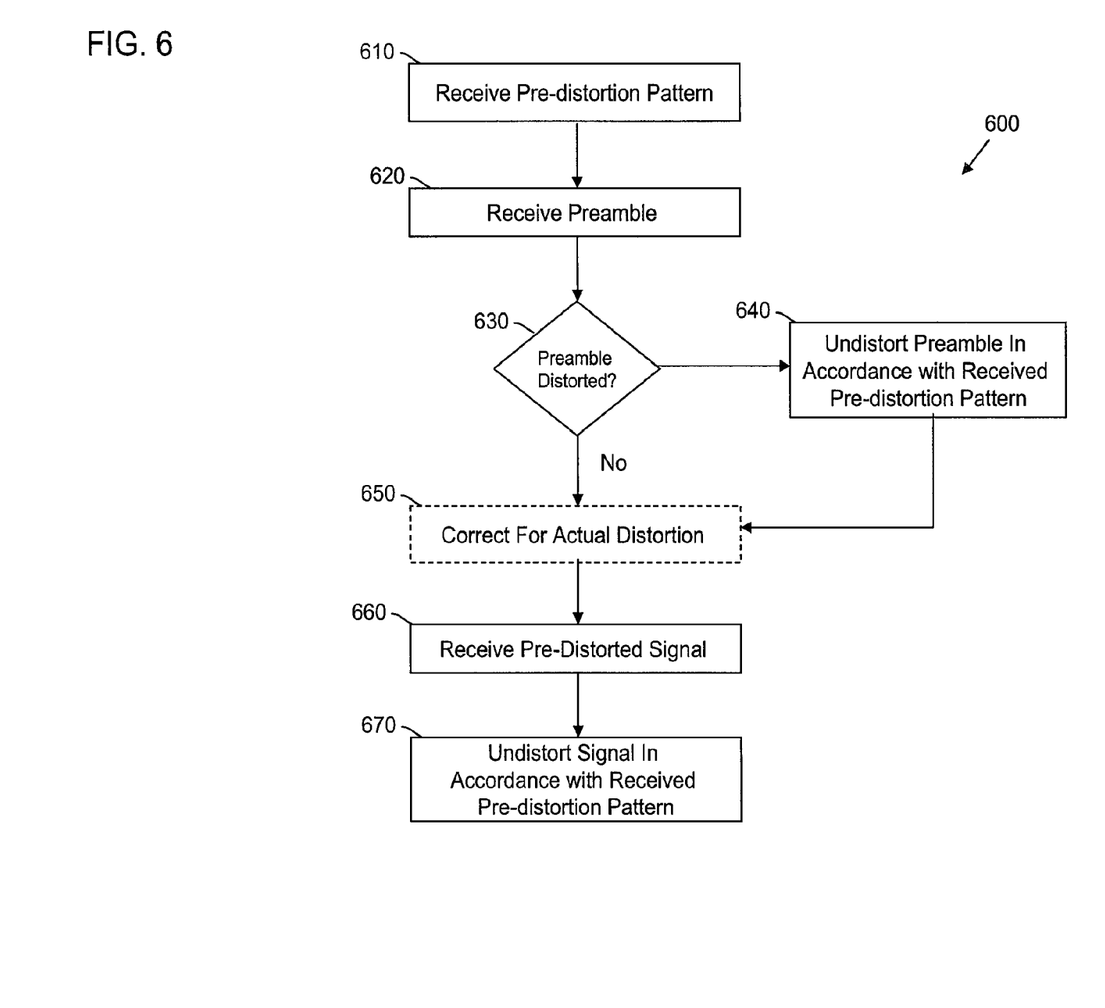
FIG. 6 is another embodiment of a process for implementing one or more aspect of the invention.

FIG. 6 describes one embodiment of a process to be carried out by the receiver side of a communication system (e.g., system 400 or 450) configured in accordance with the principles of the invention. In particular, process 600 begins at block 610 with the receiving of a pre-distortion pattern or algorithm. It should be appreciated that the pattern may be provided to the receiver in any manner, so long as it precedes the reception of a signal that has been pre-distorted in accordance with the principles of the invention. As described above, it should again be appreciated that the pre-distortion pattern of block 610 may include data representative of how a given modulation scheme is to be varied prior to transmission, such as, but not limited to, a distortion of the phase and/or amplitude of the signal modulation. The pre-distortion pattern may alternatively include data representative of how a modulation scheme may be changed from one scheme to another.

Process 600 may then continue to block 620 where the signal preamble or header frame(s) are received over the network. In certain embodiments, the digital data stream at issue will be preceded by a preamble comprised of a string of predetermined bits.

Once a preamble has been received, a determination may then be made at block 630 as to whether the modulation scheme of the preamble has been intentionally pre-distorted or not. While in one embodiment, this determination may be made by comparing the preamble to a reference, or by parsing the preamble for a pre-distortion flag or other indicator, it should be appreciated that numerous other approaches may be similarly employed.

If it is determined at block 630 that the preamble modulation has been distorted, process 600 may continue to block 640 where the preamble's modulation may be undistorted in accordance with the information contained in the pre-distortion pattern received above at block 610. In one embodiment, the undistorting operating of block 640 may be the same as the operation to be described below with reference to block 670.

In any event, once an undistorted preamble is available, whether by virtue of the preamble not having been distorted or by virtue of the undistortion operation of block 640, process 600 may continue to block 650 where any channel-condition-based distortion may be corrected or otherwise compensated for. In one embodiment, the string of predetermined bits within the preamble may be compared to a known reference pattern in order to determine the amount and direction of phase and/or amplitude distortion correction to apply to the incoming signal.

Once any actual channel-condition-based distortion has been corrected, process 600 may continue to block 660 where the pre-distorted digital data signal in question may be received. As previously mentioned, the pre-distorted signal may be received over any network, either wired or wireless, from a transmitter which has pre-distorted the modulation of the digital signal in accordance with a predetermined distortion (e.g., the pre-distortion pattern).

Continuing to refer to FIG. 6, process 600 may then continue to block 670 where the received signal may be undistorted in accordance with the pre-distortion pattern of block 610. In one embodiment, this undistortion operation may comprise altering one or both of the phases and amplitude of the signal's modulation in a inverse manner as that applied on the transmitter side. As previously mentioned, the data or information required to properly perform the undistortion operation of block 670 may be provided in the pre-distortion pattern received above at block 610.

While in one embodiment, the undistortion operation of block 670 includes reversing the distortion in the phase and/or the amplitude of the modulated signal, it should equally be appreciated that the signal may be distorted in numerous other fashions, such as changing the modulation scheme.

While process describes a single distortion operation, it should be appreciated that the such pre-distortion may vary periodically during signal transmission, even as frequently as on a symbol-by-symbol basis. When the pre-distortion varies, the undistortion operation performed at block 670 may proceed in accordance with the pre-distortion pattern of block 610. Similarly, while process 600 includes the reception of only a single preamble, it should equally be appreciated that preambles may be sent periodically in order to account for changing channel conditions and/or changing pre-distortion patterns.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A transmitter apparatus for providing secure digital communications comprising:
    a network interface configured to couple the transmitter apparatus to a network; and
    a modulation circuit configured to:
        distort at least one of a phase and an amplitude of a data signal corresponding to a signal transmission in accordance with two or more modulation schemes consecutively based on a pre-distortion pattern, the pre-distortion pattern configured to secure the signal transmission; and
        transmit, following the distorting, the data signal over the network to a intended receiver, thereby securely transmitting the signal transmission;
        wherein the pre-distortion pattern comprises data representative of how to change from one modulation scheme to another modulation scheme while undistorting the pre-distorted data signal.

2. The transmitter apparatus of claim 1, wherein the data signal comprises a video signal, and wherein the modulation circuit is further configured to encode the data signal prior to transmission in accordance with a video coding standard.

3. The transmitter apparatus of claim 1, wherein the modulation circuit is further configured to modulate the data signal in accordance with one of a binary phase-shift keying scheme, a quadrature phase-shift keying scheme, and a quadrature amplitude modulation scheme.

4. The transmitter apparatus of claim 1, wherein the network interface is further configured to transmit an undistorted preamble, prior to the data signal, over the network to the intended receiver.

5. The transmitter apparatus of claim 1, wherein the network interface is further configured to transmit a preamble, prior to transmitting the data signal, over the network to the intended receiver, wherein the preamble is distorted in accordance with the pre-distortion pattern.

6. The transmitter apparatus of claim 1, wherein the pre-distortion pattern is provided to the intended receiver prior to the transmission of the data signal.

7. A method for providing secure digital communications comprising:
    distorting at least one of a phase and an amplitude of a data signal corresponding to a signal transmission in accordance with two or more modulation schemes consecutively based on a pre-distortion pattern; and transmitting, following the distorting, the data signal over a network to the intended receiver, thereby securely transmitting the signal transmission;

wherein the pre-distortion pattern comprises data representative of how to change from one modulation scheme to another modulation scheme while undistorting the pre-distorted data signal.

8. The method of claim 7, wherein the data signal comprises a video signal, and wherein the method further comprises encoding the data signal prior to the transmitting in accordance with a video coding standard.

9. The method of claim 7, further comprising modulating the data signal in accordance with one of a binary phase-shift keying scheme, a quadrature phase-shift keying scheme, and a quadrature amplitude modulation scheme.

10. The method of claim 7, further comprising transmitting an undistorted preamble, prior to the data signal, over the network to the intended receiver.

11. The method of claim 7, further comprising transmitting a preamble, prior to the data signal, over the network to the intended receiver, wherein the preamble is distorted in accordance with the pre-distortion pattern.

* * * * *